(12) United States Patent
Huehn (10) Patent No.: US 7,651,609 B2
(45) Date of Patent: Jan. 26, 2010

(54) FILTER WITH SELF-POSITIONING CARTRIDGE ARRANGEMENT

(75) Inventor: Donald Barry Huehn, Blacksburg, VA (US)

(73) Assignee: Tetra Holding (US), Inc., Blacksburg, VA (US)

( * ) Notice: Subject to any disclaimer, the term of this patent is extended or adjusted under 35 U.S.C. 154(b) by 180 days.

(21) Appl. No.: 11/893,359

(22) Filed: Aug. 15, 2007

(65) Prior Publication Data

US 2009/0045111 A1 Feb. 19, 2009

(51) Int. Cl.
*A01K 63/04* (2006.01)
*B01D 27/00* (2006.01)

(52) U.S. Cl. .............................. 210/167.21; 210/167.27; 210/232; 119/259

(58) Field of Classification Search ............ 210/167.21, 210/167.22, 167.27, 232, 282; 119/259, 119/260

See application file for complete search history.

(56) References Cited

U.S. PATENT DOCUMENTS

| 3,513,978 | A | 5/1970 | Newsteder |
| 3,525,435 | A | 8/1970 | Conner, Jr. |
| 3,669,297 | A | 6/1972 | Willinger |
| 4,761,227 | A | 8/1988 | Willinger et al. |
| 6,210,567 | B1 * | 4/2001 | Takada ................... 210/167.22 |
| 6,797,163 | B2 | 9/2004 | Carley et al. |
| 7,252,762 | B2 | 8/2007 | Carley |
| 2004/0222137 | A1 * | 11/2004 | Hashimoto ................... 210/169 |
| 2009/0045112 | A1 | 2/2009 | Huehn et al. |
| 2009/0045113 | A1 | 2/2009 | Newman et al. |
| 2009/0045114 | A1 | 2/2009 | Huehn et al. |

* cited by examiner

*Primary Examiner*—Fred Prince
(74) *Attorney, Agent, or Firm*—Merchant & Gould P.C.

(57) ABSTRACT

An aquarium filter arrangement including a filter housing and a filter cartridge having self-spacing structure. The self-spacing structure being designed to automatically space the filter cartridge in an operable filtering position. The operable filtering position being a position at which the filter cartridge is seated against a single rib formed in the housing.

25 Claims, 9 Drawing Sheets

FILTER WITH SELF-POSITIONING CARTRIDGE ARRANGEMENT

FIELD OF THE INVENTION

The present disclosure relates generally to devices for use in the aquatics industry, and various methods associated with such devices. More particularly, this disclosure relates to a filter housing and filter cartridge for use in filtering aquarium water.

BACKGROUND OF THE INVENTION

To maintain an ecological balance within an aquarium, it is necessary to clean the aquarium water. Cleaning is often accomplished by filtering the aquarium water through a filter housing. In the filter housing, water enters a filter chamber, flows through a filter element, and is then returned to the aquarium. Through normal filtering operation, various particulates become trapped in the filter element, requiring the user to regularly service (i.e., maintain and/or replace) the filter element.

In most aquarium set ups, the filter housing is placed at or near a rear wall of the aquarium. When the filter element is serviced, the user removes and/or inserts the filter element from the filter housing; the filter housing remaining stationary at or near the rear aquarium wall. A common complaint is that the service procedure, and in particular the insertion of a filter element into the housing, can be difficult. Specifically, conventional filter housings often have parallel guide rails that define a slot within which each edge of the filter element must be aligned to insert the filter element. Given the rear wall location of the filter housing, alignment and insertion can be a challenge that requires finesse and practice to complete.

In general, improvement has been sought with respect to such filter devices and arrangements, generally to accommodate ease-of-use for the user.

SUMMARY OF THE INVENTION

The present disclosure relates to an aquarium filter including a filter housing and filter cartridge arrangement that permits a user to easily service the aquarium filter. The filter housing and cartridge arrangement includes self-positioning or self-spacing structure that automatically positions the filter cartridge in an operable filtering position relative to the filter housing. What is meant by operable filtering position is that the filter cartridge is properly positioned for filtering operations (i.e., the cartridge is positioned so that water flowing through the filter housing generally passes through the filter cartridge for filtration purposes). Further, what is meant by "automatically" is that the structure of the arrangement, as opposed to a user's maneuvering, is what primarily places or locates the filter cartridge in the operable filtering position. In the present filter, the user need not finesse or exercise practiced skill in aligning the filter cartridge relative to the housing; instead, the self-spacing structure of the cartridge and housing arrangement properly locates and places the filter cartridge in the operable filtering position.

A variety of examples of desirable product features or methods are set forth in part in the description that follows, and in part will be apparent from the description, or may be learned by practicing various aspects of the disclosure. The aspects of the disclosure may relate to individual features as well as combinations of features. It is to be understood that both the foregoing general description and the following detailed description are explanatory only, and are not restrictive of the claimed invention.

DETAILED DESCRIPTION

Reference will now be made in detail to exemplary aspects of the present disclosure that are illustrated in the accompanying drawings. Wherever possible, the same reference numbers will be used throughout the drawings to refer to the same or like parts.

Figure 1:
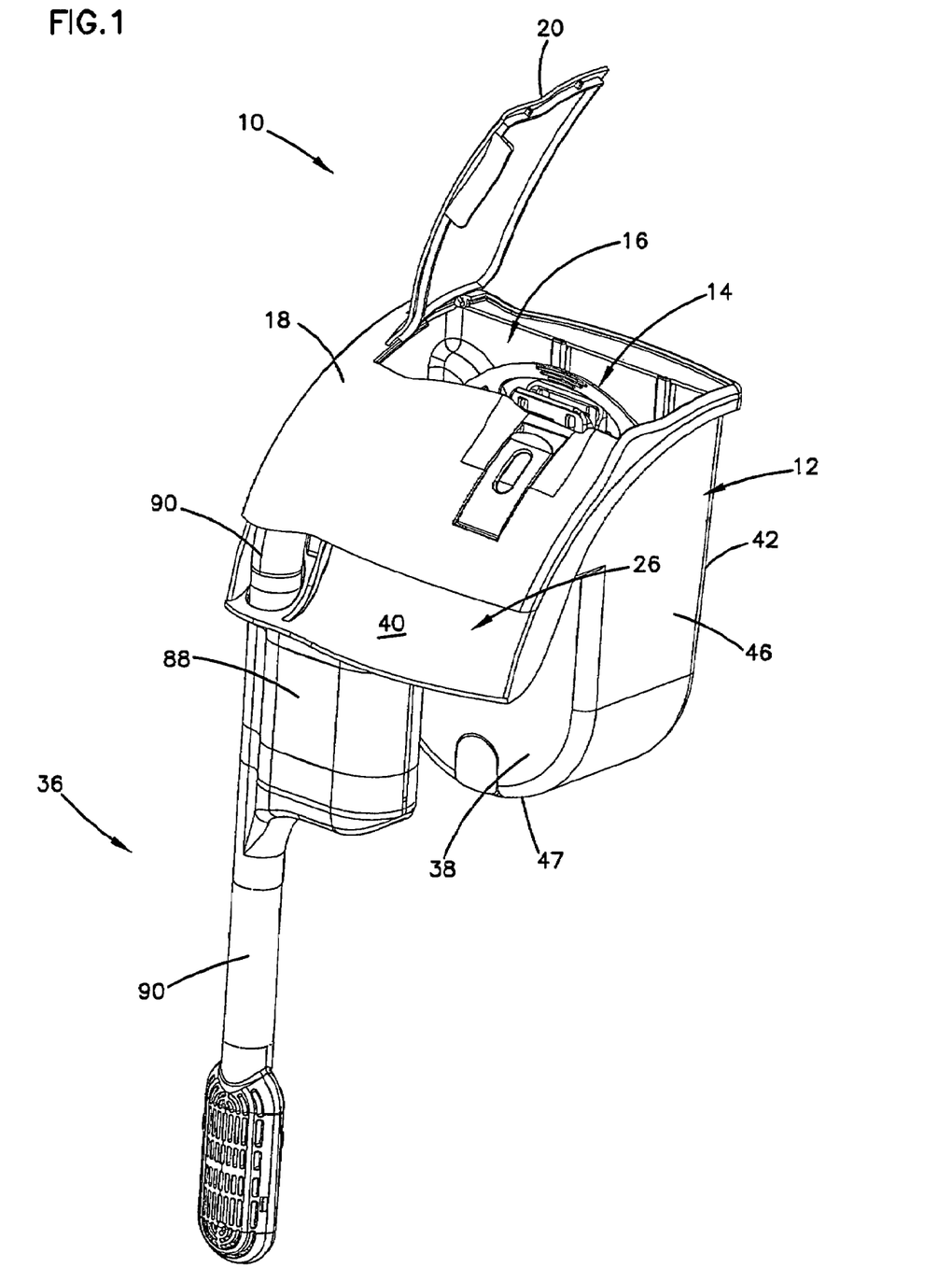
FIG. 1 is a front perspective view of an aquarium filter including a filter cartridge and filter housing in accordance with the principles disclosed.

FIG. 1 illustrates an aquarium filter 10 including a filter housing 12 and a filter cartridge 14 (e.g., filter element, filter element assembly, or filter cartridge assembly) having features in accordance with the principles disclosed. The filter 10 is designed for use in an aquarium; however, the features of the present filter can be used in filters designed for other aquatic applications, such as in pond applications, for example.

As will be described in greater detail hereinafter, the present aquarium filter 10 is designed to be easy and convenient to service. In particular, in one aspect, the disclosed filter housing 12 and filter cartridge 14 are constructed so that a user can simply place or deposit the filter cartridge into the filter housing, the housing and cartridge having self-positioning or self-spacing structure that seats the filter cartridge in the correct or proper position for filtering operation.

Figure 2:
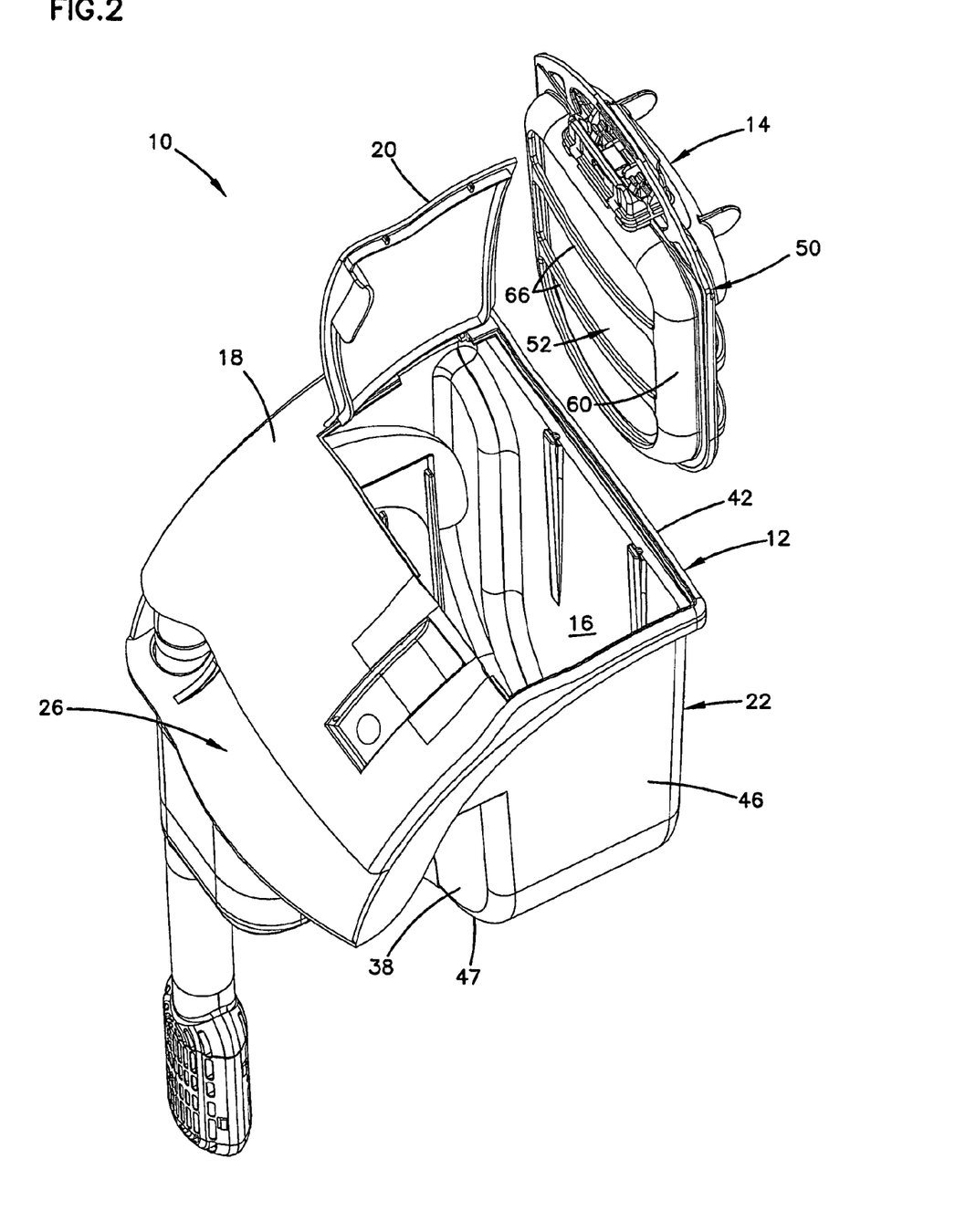
FIG. 2 is a top perspective view of the aquarium filter of FIG. 1, showing an interior filtering chamber of the filter housing.

Referring to FIGS. 1 and 2, the filter housing 12 of the aquarium filter 10 defines an interior filtering chamber 16. During filtration, the filter cartridge 14 is located within the interior filtering chamber 16. A filter cover 18 can be positioned over the filtering chamber 16 to enclose the filter cartridge 14 within the housing 12. In the illustrated embodiment, the cover 18 includes a door 20 that provides access to the filtering chamber 16. The filter cartridge 14 can be removed from and inserted into the filtering chamber 16 through the door 20. In the alternative, the entire cover 18 can be removed to remove or insert the filter cartridge 14.

The filter housing 12 generally includes a main filter housing portion 22, a housing input 24 (shown in FIG. 8) and a housing output 26. The main housing portion 22 of the aquarium filter 10 has a front wall 38, a rear wall 42, a first side wall 44 (shown in FIG. 8), a second opposite side wall 46, and a bottom wall 47. The front, rear, side and bottom walls define the filtering chamber 16. A top 45 (FIG. 8) of the main housing portion 22 is open for receiving the filter cartridge 14.

Further details of a filter housing that can be used in the present aquarium filter are described in U.S. patent application Ser. No. 11/893,367.

Figure 8:
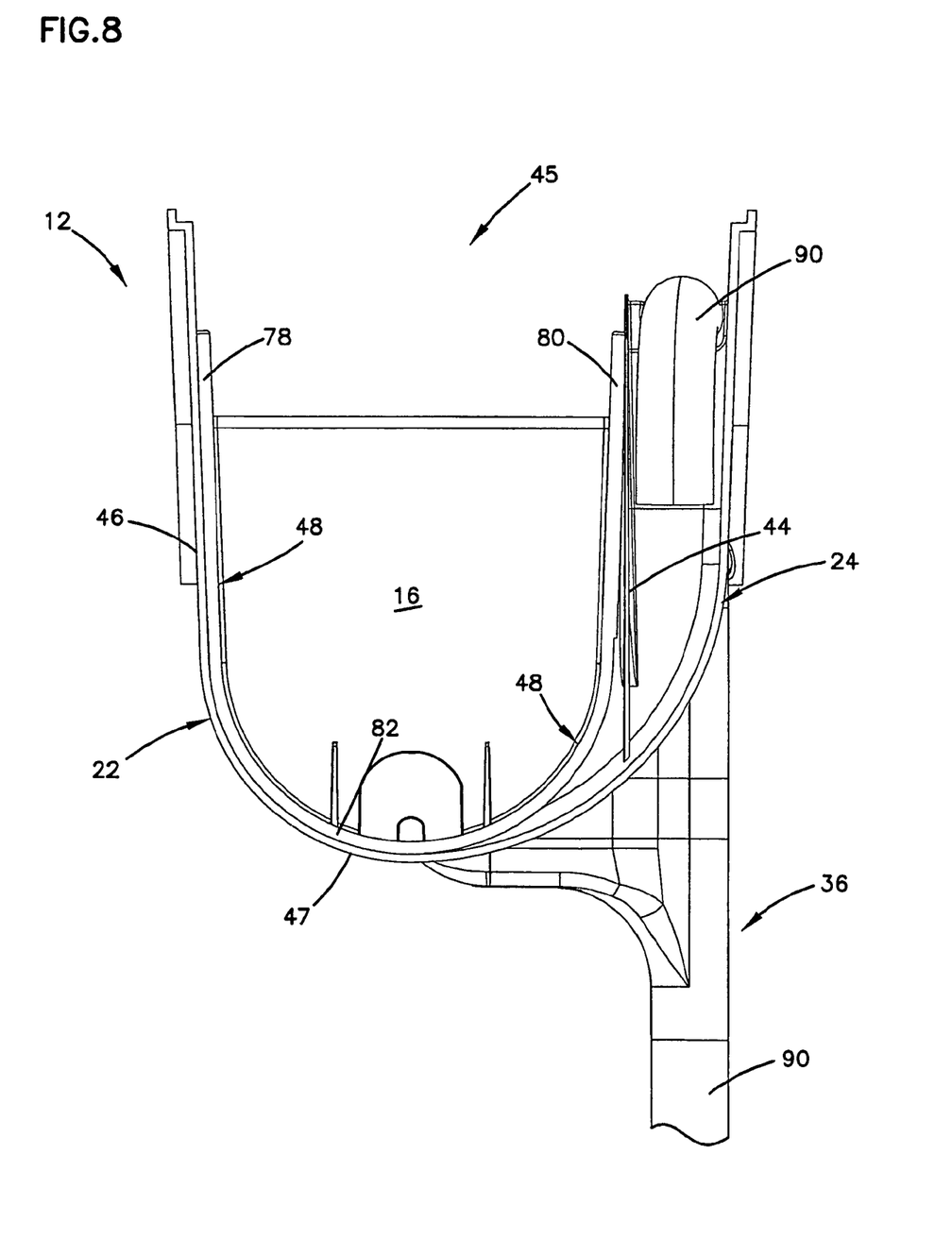
FIG. 8 is a rear elevation view of the interior filtering chamber of the filter housing of FIG. 2, the filter housing being illustrated without a rear wall.

Referring to FIG. 8, the input 24 of the housing 12 is located at one of the sides of the main filter housing portion 22. In the illustrated embodiment, the input 24 is located at the first side wall 44 of the main filter housing portion 22. Water is drawn or directed from the aquarium into the filtering chamber 16 through the housing input 24. In particular and referring back to FIG. 1, the aquarium filter 10 includes an intake assembly 36 that is in fluid communication with the housing input 24. The intake assembly 36 includes a motor (not shown) contained within a motor housing 88. The motor draws water from the aquarium through an intake tube 90 that directs the water into the input 24; the input 24 in turn directing the water into the filtering chamber 16 of the filter housing 12.

Figure 3:
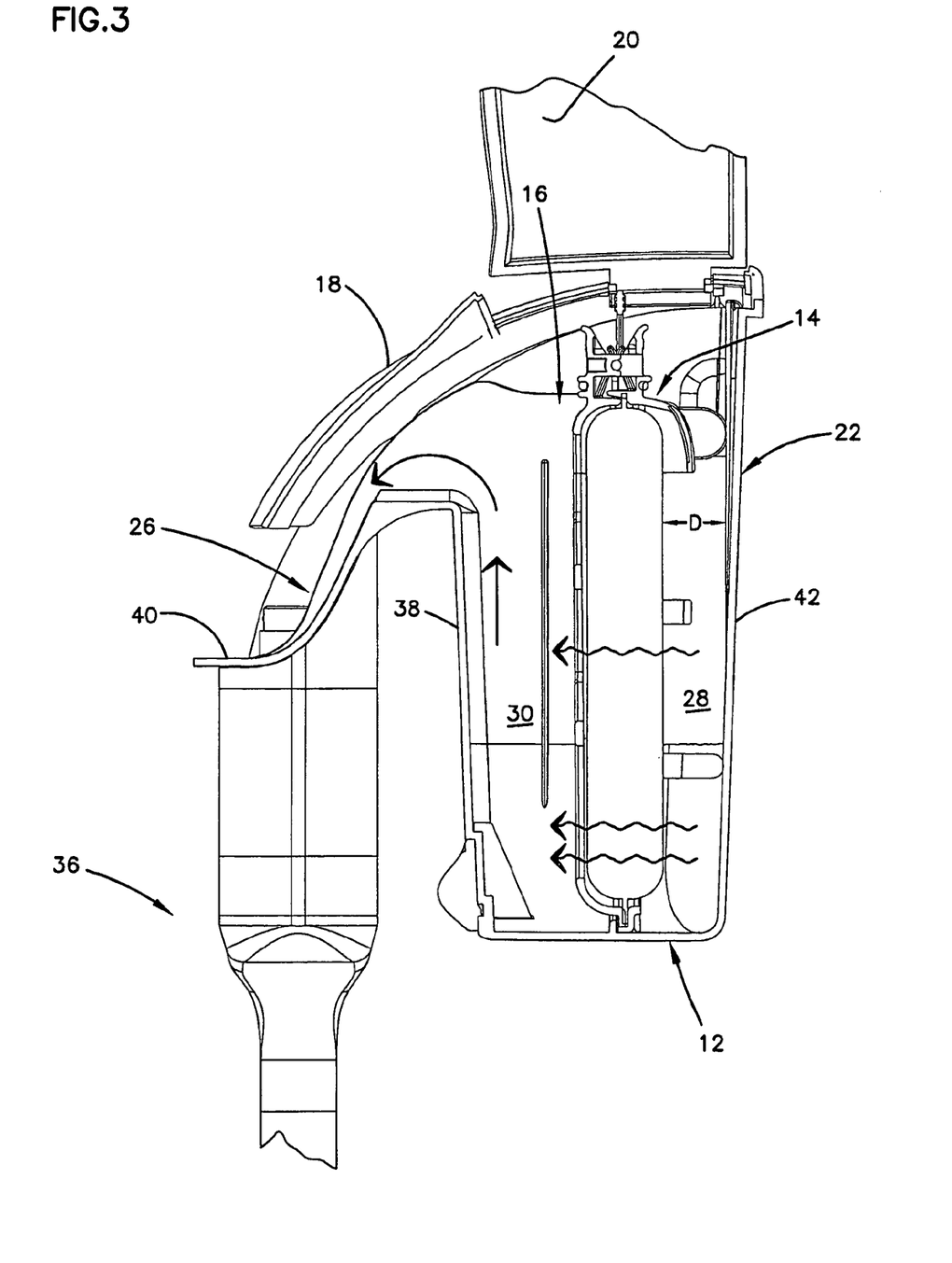
FIG. 3 is a cross-sectional side perspective view of the aquarium filter of FIG. 1.

Referring now to FIG. 3, when the filter cartridge 14 is positioned within the filtering chamber 16, the filter cartridge 14 divides the filtering chamber 16 into an upstream, unfiltered water chamber side 28 and a downstream, filtered water chamber side 30. The upstream, unfiltered water chamber side 28 is located rearward of the downstream, filtered water chamber side 30 in the housing 12. In use, water flows by gravity from the rearward unfiltered water chamber side 28 through the filter cartridge 14 to the forward filtered water chamber side 30.

From the downstream filtered water chamber side 30, the filtered water is returned to the aquarium by way of the housing output 26. In particular, the water rises within the filtered water chamber side 30 until it exits over the front wall 38 of the main housing portion 22 (see arrows). In the illustrated embodiment, the output 26 includes a spillway lip 40 formed in the front wall 38 of the main housing portion 22.

Figure 4:
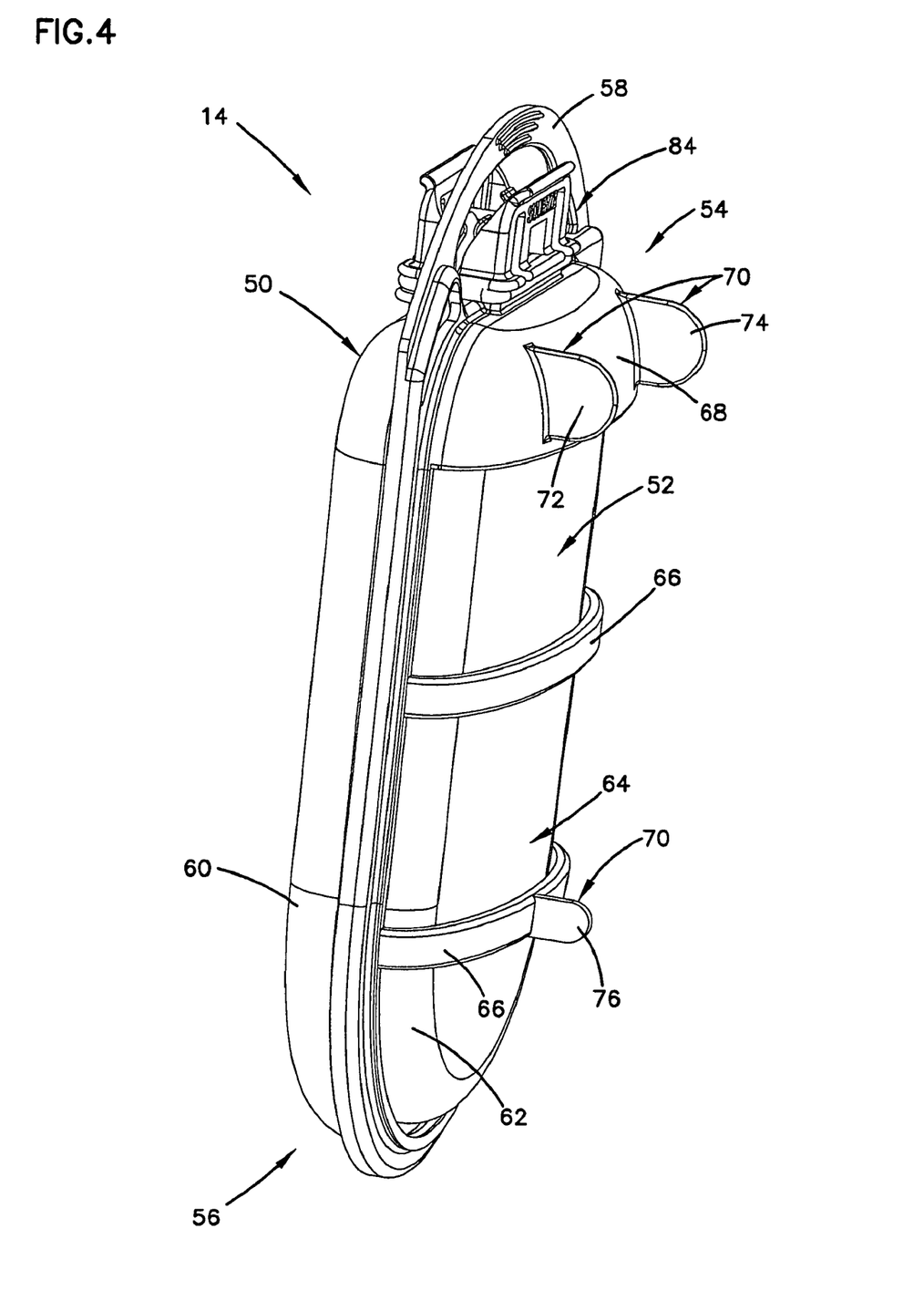
FIG. 4 is a rear perspective view of the filter cartridge of FIG. 2, shown in isolation.
Figure 5:
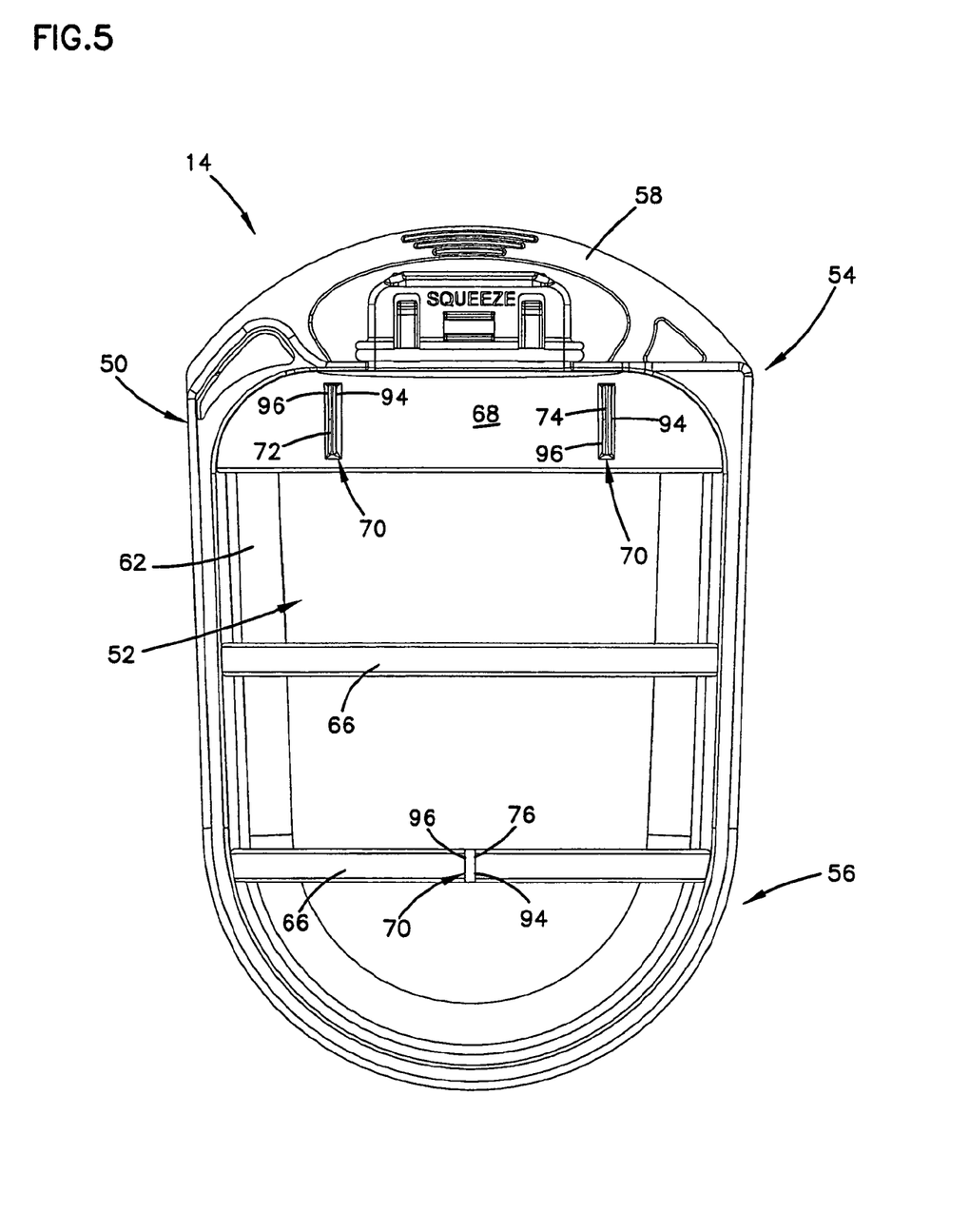
FIG. 5 is a rear elevation view of the filter cartridge of FIG. 4.

Referring now to FIGS. 4 and 5, the filter cartridge 14 generally includes a carrier or support frame 50 and a filter element or filter media 52 secured relative to the support frame 50. In the illustrated embodiment, the support frame 50 generally has a tapering or narrowing configuration. In particular, and as illustrated in FIG. 5, the support frame 50 tapers from a first end 54 toward a second end 56. A handle 58 is located at the first end 54 of the support frame 50 for maneuvering and carrying the filter cartridge 14.

Referring to FIG. 4, the support frame 50 includes a first frontward frame section 60 (see also FIG. 2) that defines a front side of the support frame 50, and a second rearward frame section 62 that defines a rear side of the support frame. The frame sections 60, 62 are interconnected to one another at a hinged connection 84. The hinged connection 84 permits the sections 60, 62 to hinge or pivot relative to one another from a closed position to an open position to provide access to the filter media 52.

In particular, the filter media 52 is captured or retained between the frontward and rearward frame sections 60, 62; i.e., within a cartridge interior 64 defined by the frame sections. The hinged connection 84 permits a user to open and close the support frame 50 to remove filter media from or insert filter media into the cartridge interior 64. Further details of such a hinged connection are found in U.S. patent application Ser. No. 11/893,383; which application is incorporated herein by reference. Also, further details of filter media that can be used with the disclosed support frame 50 are found in U.S. patent application Ser. No. 11/893,385; which application is incorporated herein by reference.

In the illustrated embodiment, each of the frontward and rearward sides of the support frame 50 is primarily open to encourage water flow through the filter media 52. What is meant by primarily open is that the front and rear sides of the support frame 50 have more open regions than that of structural surface area (see FIGS. 2 and 5). Transverse cross supports 66 can be provided to ensure the relative positioning/placement of the filter media 52 within the support frame 50.

Referring again to FIGS. 4 and 5, the filter cartridge 14 further includes at least one protruding tab 70 (e.g., spacer or rib) that extends or projects outward from the rearward frame section 62 of the support frame 50. In the illustrated embodiment, the filter cartridge has a plurality of tabs including first and second upper tabs 72, 74 located adjacent to the first end 54 of the support frame 50, and a lower tab 76 located adjacent to the second end 56 of the support frame. The upper tabs 72, 74 are provided on a water collection structure 68 located at the first end 54 of the support frame. Further details of such a water collection structure are found in U.S. patent application Ser. No. 11/893,383; which application is previously incorporated herein by reference. The lower tab 76 is centrally located on a cross support 66. Each of the tabs 70 (including tabs 72, 74, 76) extends in a transverse direction relative to the rear side of the support frame 50.

Figure 6:
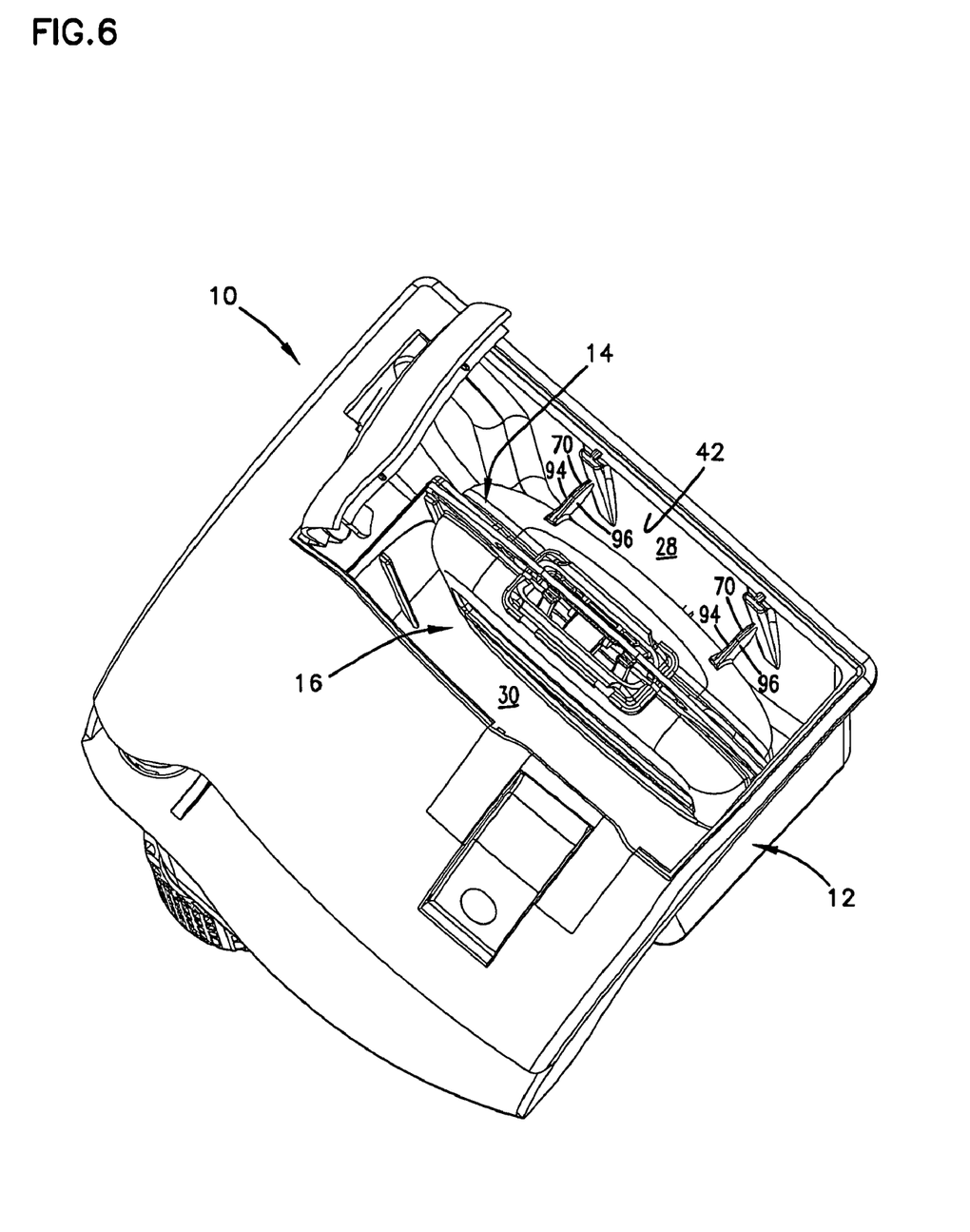
FIG. 6 is a top perspective view of the aquarium filter of FIG. 1.
Figure 7:
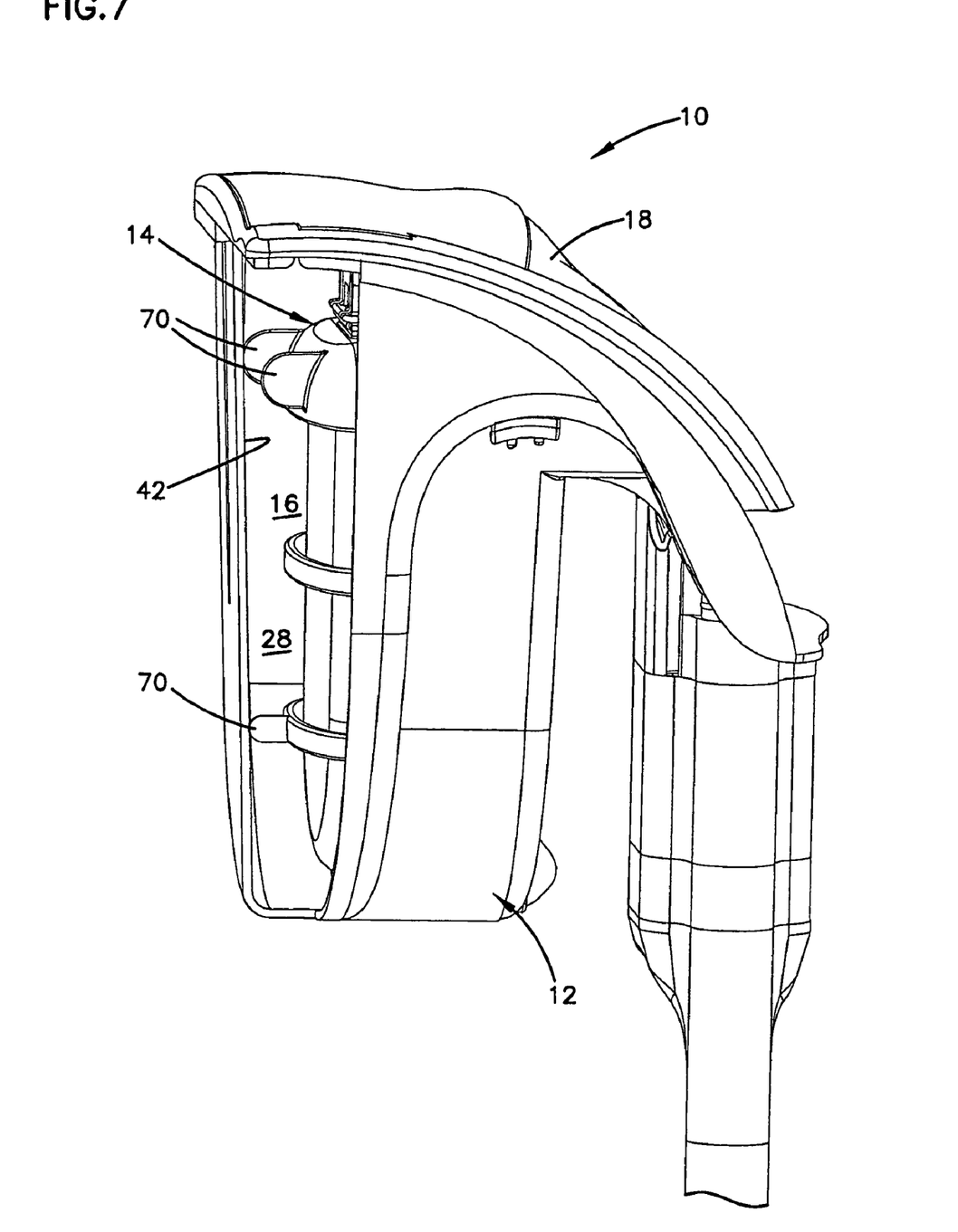
FIG. 7 is a side perspective view of the aquarium filter of FIG. 1, shown with a portion of filter housing cut away.

Referring now to FIGS. 6 and 7, when the filter cartridge 14 is placed or deposited into the interior filtering chamber 16 of the filter housing 12, the tabs 70 contact the rear wall 42 of the filter housing 12 to space the filter cartridge 14 a distance from the rear wall 42. Referring back to FIG. 3, the distance at which the filter cartridge is spaced generally defines the depth D of the unfiltered water chamber side 28 of the filter housing 12.

Figure 9:
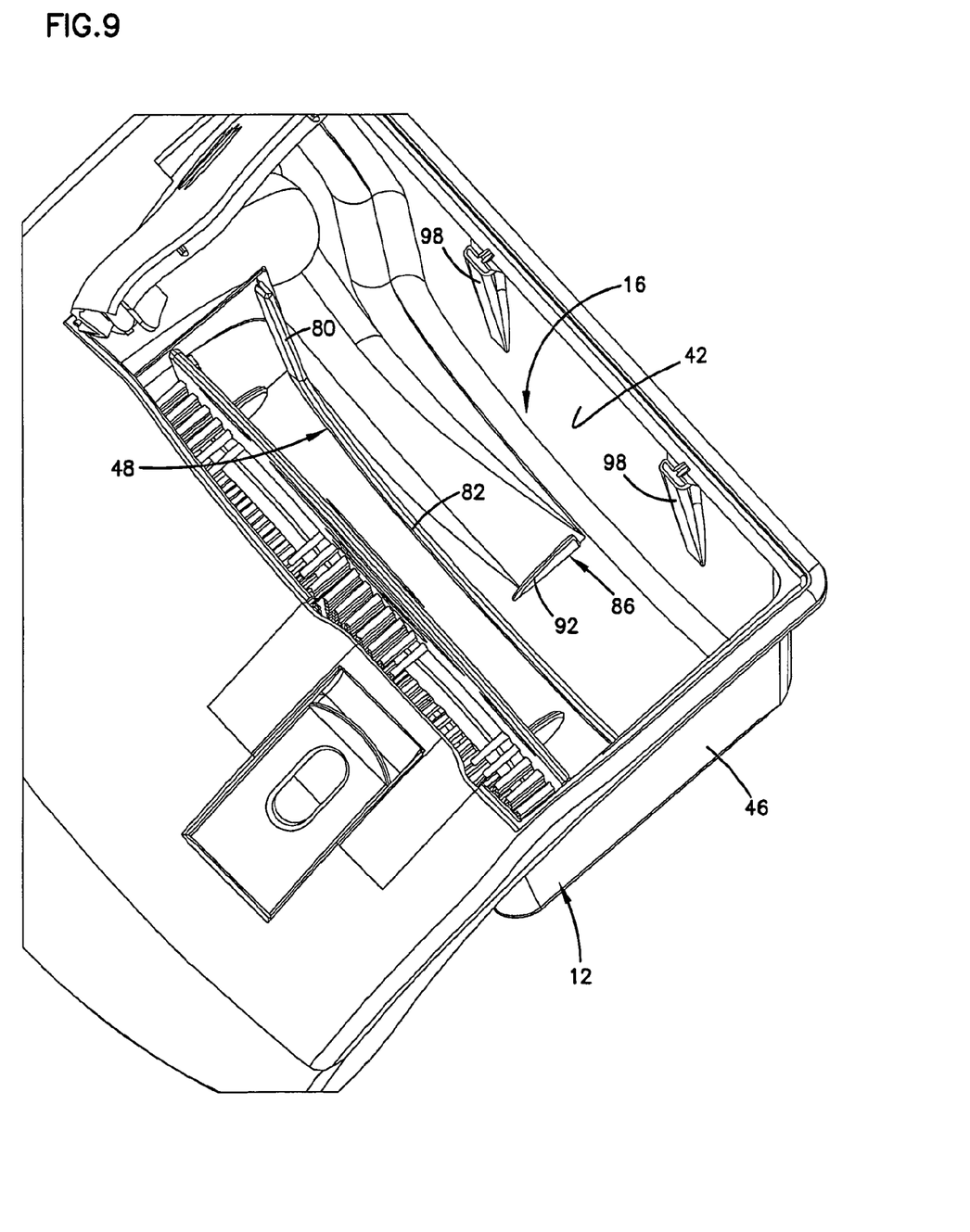
FIG. 9 is a top perspective view of the interior filtering chamber of the filter housing of FIG. 2.

Referring now to FIGS. 8 and 9, forward spacing of the filter cartridge 14 is limited by retaining structure provided in the filtering chamber 16 of the filter housing 12. In particular, the filter housing 12 has a single rib or ridge 48 that constrains the forward placement of the filter cartridge 14. What is meant by single rib is that only one rib is provided as opposed to two parallel ribs (e.g., side-by-side ribs) that capture a filter element therebetween. The single rib can include a unitary length of rib or a segmented rib having spaced rib portions. The filter cartridge 14 seats against the single rib 48 when the filter cartridge 14 is deposited in the filter housing 12.

In the illustrated embodiment, the single rib 48 includes at least first and second vertical rib portions 78, 80 formed on interior surfaces of the first and second side walls 44, 46 of the filter housing 12. An interconnecting rib portion 82 that joins the first and second vertical rib portions 78, 80 is formed along a bottom interior surface of the housing. The single rib 48 functions to not only provide an opposing constraint to properly position the filter cartridge, the single rib 48 further functions to prevent water flow by-pass under or around the edges of the filter cartridge 14. The water flow instead generally flows through the filter cartridge.

To install the filter cartridge 14, a user simply deposits or inserts the filter cartridge in the filtering chamber 16 of the filter housing 12. As can be understood, the tapering construction of the filter cartridge aids in the downward movement or insertion of the cartridge. The tabs 70 of the filter cartridge and the vertical guides 78, 80 of the housing cooperate to align the cartridge automatically upon downward movement of the cartridge. That is, the user need not be concerned with viewing and aligning edges of the filter cartridge within a groove or between two parallel guide rails, which can be difficult given the rearward location of filter housings in most aquarium set-ups. Rather, the tabs 70 automatically contact the rear wall 42 of the filter housing to position the filter cartridge 14 in the proper forward position against the vertical guides 78, 80.

The tabs 70 are further designed to have a generally flat construction, and are oriented such that the opposing planar surfaces 94, 96 (FIG. 6) of the tabs 70 are generally perpendicular to the rear side of the support frame 50, i.e., the primary planar surfaces are parallel to the general direction of water flow through the filter media 52.

Referring to FIG. 9, in one embodiment an angled fin 86 can be located in the bottom region of the filter housing 12. The angled fin 86 aids in the forward placement of the filter cartridge 14. As the cartridge moves downward during installation, the second end 56 of the support frame 50 may contact an angled surface 92 of the fin 86 to direct the support frame 50 forward. The rear wall 42 of the housing 12 can further include optional standoffs 98 having an angled construction. The angled construction of the standoffs 98 also aid in properly positioning the filter cartridge 14 in the forward operable filtering position relative to the filter housing 12. The angled standoffs illustrated contact only the upper tabs 72, 74 of the filter cartridge 14; however, a lower standoff that contacts the lower tab 76 of the cartridge can be provided in lieu of the angled fin.

In general, the filter housing 12 and cartridge 14 provide a self-spacing arrangement that automatically positions the filter cartridge in the operable filtering position relative to the filter housing. That is, while the user drops or guides the filter cartridge downward into the filtering chamber 16, the arrangement between the filter housing 12 and cartridge 14 functions to seat the filter cartridge 14 against the single rib 48 formed in the filter housing 12. Accordingly, to install the filter cartridge, the user need not be concerned about precisely placing the filter cartridge within the operable filter position; rather, the user can simply deposit the filter cartridge 14 within the top opening of the filter housing 12 in a general region offset from the operable filter position. As the filter drops or moves downward, the filter cartridge 14 automatically moves forward via contact between the tabs 70 and the upright rear wall 42 of the filter housing 12.

The above specification provides a complete description of the present invention. Since many embodiments of the invention can be made without departing from the spirit and scope of the invention, certain aspects of the invention reside in the claims hereinafter appended.

What is claimed is:

1. An aquarium filter arrangement, comprising:
   a) a filter housing having a front wall, a rear wall, and opposite side walls, the front, rear and side walls defining a filtering chamber, the filter housing further including a single rib located in the filtering chamber, the single rib including first and second vertical rib portions each formed on an interior surface of one of the side walls and an interconnecting rib portion formed along a bottom interior surface of the filter housing; and
   b) a filter cartridge positionable within the filtering chamber of the filter housing, the filter cartridge including a tab projecting outward from a rear side of the filter cartridge;
   c) wherein the tab of the filter cartridge contacts the rear wall of the filter housing to space the filter cartridge a distance from the rear wall, and wherein the filter cartridge seats against the single rib of the filter housing, when the filter cartridge is deposited in the filter housing.

2. The arrangement of claim 1, wherein the filter cartridge divides the filtering chamber into an unfiltered water chamber side and a filtered water chamber side when deposited in the filter housing, the distance between the filter cartridge and the rear wall of the filter housing defining a depth of the unfiltered water chamber side.

3. The arrangement of claim 1, further including a fin located in a bottom region of the filtering chamber, wherein the fin guides the filter cartridge toward the front wall of the filter housing when the filter cartridge is deposited in the filter housing.

4. The arrangement of claim 1, wherein the filter cartridge has a first end and a second end, the second end having a tapering construction.

5. The arrangement of claim 4, wherein the filter cartridge includes a plurality of tabs that space the cartridge from the rear wall of the filter housing, and wherein the tabs include an upper tab located adjacent to the first end of the filter cartridge and a lower tab located adjacent to the second end.

6. The arrangement of claim 1, wherein filter cartridge includes a support frame and filter media positioned within an interior region of the support frame.

7. The arrangement of claim 6, wherein the support frame includes a first frame section and a second frame section, the first and second frame sections being interconnected to one another at a hinged connection.

8. The arrangement of claim 1, wherein the tab has a generally flat construction defined by opposing primary planar surfaces, the opposing primary planar surfaces being oriented in a generally perpendicular direction relative to a rear side of filter cartridge.

9. An aquarium filter arrangement, comprising:
   a) a filter housing having a front wall, a rear wall, and opposite side walls, the front, rear and side walls defining a filtering chamber, the filter housing further including a fin located in a bottom region of the filtering chamber; and
   b) a filter cartridge positionable within the filtering chamber of the filter housing, the filter cartridge including a tab projecting outward from a rear side of the filter cartridge;
   c) wherein the fin guides the filter cartridge toward the front wall of the filter housing, and wherein the tab of the filter cartridge contacts the rear wall of the filter housing to space the filter cartridge a distance from the rear wall, when the filter cartridge is deposited in the filter housing.

10. The arrangement of claim 9, wherein the filter cartridge has a first end and a second end, the second end having a tapering construction.

11. The arrangement of claim 9, wherein the filter cartridge includes a plurality of tabs that space the cartridge from the rear wall of the filter housing, and wherein the tabs include an upper tab located adjacent to a first end of the filter cartridge and a lower tab located adjacent to a second end.

12. The arrangement of claim 9, wherein filter cartridge includes a support frame and filter media positioned within an interior region of the support frame.

13. The arrangement of claim 12, wherein the support frame includes first and second frame sections interconnected to one another at a hinged connection.

14. An aquarium filter arrangement, comprising:
   a) a filter housing having a front wall, a rear wall, and opposite side walls, the front, rear and side walls defining a filtering chamber; and
   b) a filter cartridge positionable within the filtering chamber of the filter housing, the filter cartridge including a tab projecting outward from a rear side of the filter cartridge, the filter cartridge having a first end and a second end, the second end having a tapering construction;
   c) wherein the tab of the filter cartridge contacts the rear wall of the filter housing to space the filter cartridge a distance from the rear wall when the filter cartridge is deposited in the filter housing.

15. The arrangement of claim 14, wherein the filter cartridge includes a plurality of tabs that space the cartridge from the rear wall of the filter housing, and wherein the tabs include an upper tab located adjacent to the first end of the filter cartridge and a lower tab located adjacent to the second end.

16. The arrangement of claim 14, wherein filter cartridge includes a support frame and filter media positioned within an interior region of the support frame.

17. The arrangement of claim 16, wherein the support frame includes first and second frame sections interconnected to one another at a hinged connection.

18. An aquarium filter arrangement, comprising:
a) a filter housing having a front wall, a rear wall, and opposite side walls, the front, rear and side walls defining a filtering chamber; and
b) a filter cartridge positionable within the filtering chamber of the filter housing, the filter cartridge including:
  i) a support frame having a first frame section and a second frame section, the first and second frame sections being interconnected to one another at a hinged connection;
  ii) filter media positioned within an interior region of the support frame; and
  iii) a tab projecting outward from a rear side of the filter cartridge;
c) wherein the tab of the filter cartridge contacts the rear wall of the filter housing to space the filter cartridge a distance from the rear wall when the filter cartridge is deposited in the filter housing.

19. The arrangement of claim 18, wherein the filter cartridge includes a plurality of tabs that space the cartridge from the rear wall of the filter housing, and wherein the tabs include an upper tab located adjacent to a first end of the filter cartridge and a lower tab located adjacent to a second end.

20. An aquarium filter arrangement, comprising:
a) a filter housing having a front wall, a rear wall, and opposite side walls, the front, rear and side walls defining a filtering chamber; and
b) a filter cartridge positionable within the filtering chamber of the filter housing, the filter cartridge including a tab projecting outward from a rear side of the filter cartridge, the tab having a generally flat construction defined by opposing primary planar surfaces, the opposing primary planar surfaces being oriented in a generally perpendicular direction relative to a rear side of filter cartridge;
c) wherein the tab of the filter cartridge contacts the rear wall of the filter housing to space the filter cartridge a distance from the rear wall when the filter cartridge is deposited in the filter housing.

21. The arrangement of claim 20, wherein the filter cartridge has a first end and a second end, the second end having a tapering construction.

22. The arrangement of claim 20, wherein the filter cartridge includes a plurality of tabs that space the cartridge from the rear wall of the filter housing, and wherein the tabs include an upper tab located adjacent to a first end of the filter cartridge and a lower tab located adjacent to a second end.

23. The arrangement of claim 20, wherein filter cartridge includes a support frame and filter media positioned within an interior region of the support frame.

24. The arrangement of claim 23, wherein the support frame includes first and second frame sections interconnected to one another at a hinged connection.

25. The arrangement of claim 20, further including a fin located in a bottom region of the filtering chamber, wherein the fin guides the filter cartridge toward the front wall of the filter housing when the filter cartridge is deposited in the filter housing.

* * * * *